US008235554B2

(12) United States Patent
Steinkraus

(10) Patent No.: US 8,235,554 B2
(45) Date of Patent: Aug. 7, 2012

(54) LED REFLECTOR FIXTURE

(75) Inventor: Thomas F. Steinkraus, Glendora, CA (US)

(73) Assignee: Intense Lighting, LLC, Anaheim, CA (US)

( * ) Notice: Subject to any disclaimer, the term of this patent is extended or adjusted under 35 U.S.C. 154(b) by 540 days.

(21) Appl. No.: 12/580,750

(22) Filed: Oct. 16, 2009

(65) Prior Publication Data

US 2011/0090680 A1 Apr. 21, 2011

(51) Int. Cl.
*B60Q 1/14* (2006.01)

(52) U.S. Cl. .............. 362/283; 362/217.05; 362/249.02; 362/277; 362/319; 362/322

(58) Field of Classification Search ........... 362/217.05–217.07, 249.02, 249.03, 362/277–284, 319–325
See application file for complete search history.

(56) References Cited

U.S. PATENT DOCUMENTS 3,018,077 A 1/1962 Buehler
3,544,782 A 12/1970 Hahn
6,382,817 B1 * 5/2002 Chelf ............................ 362/322
6,457,846 B2 10/2002 Cook et al.
6,553,629 B2 4/2003 Grady et al.
6,705,745 B1 3/2004 Pederson
7,677,764 B2 * 3/2010 Lin ............................... 362/283
2006/0203493 A1 9/2006 Brower et al.
2008/0007418 A1 1/2008 Maki et al.
2008/0106892 A1 5/2008 Griffiths

OTHER PUBLICATIONS

"International Search Report," International Application No. PCT/US2010/052533, (3 pages), Date of mailing Dec. 9, 2010.
"PCT Written Opinion of the International Searching Authority," International Application No. PCT/US2010/052533, (4 pages), Date of completion of Opinion Nov. 24, 2010, Date of mailing Dec. 9, 2010.
"HF2 Narrow Stick: Compact High Intensity LED Module", Osram Sylvania, Inc., www.sylvania.com, Danvers, MA, copyright 2009, 4 pages.
"Luxrail", io Lighting, www.iolighting.com, Vernon Hills, IL, copyright 2007, 2 pages.
"Wagnerail System" Catalog, The Wagner Companies, www.lumenrail.com, pp. 10-25. 16 pages, Apr. 16, 2007.

* cited by examiner

*Primary Examiner* — Stephen F Husar
(74) *Attorney, Agent, or Firm* — Stetina Brunda Garred & Brucker

(57) ABSTRACT

Provided is a light fixture having a first elongate body defining a mounting surface. A light module is disposed adjacent the mounting surface and includes a module body and a plurality of light emitting devices disposed on the mounting body. The light emitting device defines an emitting axis about which light is emitted. The fixture further includes a first reflector member and a second reflector member disposed on opposed sides of the emitting axis for reflecting light emanated by the light emitting devices. The first reflector member and the second reflector member are pivotable to vary the angle at which light is emitted from the light fixture.

20 Claims, 4 Drawing Sheets

LED REFLECTOR FIXTURE

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention is generally directed toward LED light fixtures, and more specifically, to a LED light fixture which may be configured to allow a user to adjust the angle at which light is emitted from the fixture, as well as to enable quick and easy access to the LED lights for replacement or repair.

Lights are commonly used for many different reasons. For instance, lights may serve a primarily utilitarian purpose by illuminating an otherwise dark, or dimly lit area. Lights may also be used for decorative purposes to enhance the aesthetic appearance of an area or object (i.e., landscape lighting, accent lighting, etc.).

Given the wide range of applications lights may be used, there are a variety of different light fixtures which may be employed to accommodate the various functionalities lights may serve. For interior residential applications, recessed lighting may be integrated into the ceiling or wall to provide light for a room. Floor lamps and table lamps may also be used to light an area adjacent to the lamp. With regard to exterior lighting, specially designed light fixtures may be mounted in the ground to illuminate landscape features. Lighting may also be used to illuminate a walkway or stairwell. This may be achieved by integrating lights into each step, or into an adjacent wall.

It is well-known that light generally emanates in all directions from its source. This may be desirable in some cases (i.e., when a light is used to illuminate an entire room), yet undesirable in other situations (i.e., when it is desirable to focus light onto a given area). Therefore, some light fixtures include reflectors to focus the light onto the desired area. The reflectors may be fixed to limit the light dispersion within a defined angular range (i.e., 45 degrees). Although such reflectors tend to be useful in focusing the light, they may be limited in their usage, since they do not afford flexibility.

It is additionally well-known that lights such as light bulbs, fluorescent tubes and/or LEDs are typically functional for a limited period of time. One or more components in the light source typically fails after long-time usage thereof. Moreover, the light source components are generally very delicate. As such, light source components may be easily broken during use, which may require replacement of the light source. When the light source "burns out" or breaks, it is usually replaced with a new light source.

Given that light sources are commonly replaced, it is desirable to have easy access to the light source to facilitate replacement thereof. However, when multiple light sources require replacement, the process of replacing the light sources may be very time consuming, as each sources is generally replaced, individually.

In view of the foregoing, there is a need in the art for a lighting device which allows variation of the range of light emission. There is also a need in the art for a lighting device which allows a user to quickly and easily replace multiple light sources.

BRIEF SUMMARY

Provided is a light fixture which may be configured to allow a user to adjust the angle at which light emanates from the light fixture. The light fixture may also be configured to allow a user to quickly and easily replace the light emitting device connected to the light fixture.

One embodiment of the light fixture includes a first elongate body defining a mounting surface. The light fixture further includes a light module having a module body having a first face and an opposing second face, with the first face being disposed adjacent the mounting surface. A light emitting device is mounted to the second face of the module body. The light emitting device defines an emitting axis about which light is emitted. The light fixture additionally includes a first reflector member having a first reflector surface configured to reflect light. The first reflector surface and the emitting axis define a first reflector angle, with the first reflector surface being moveable relative to the emitting axis to vary the first reflector angle. The light fixture further includes a second reflector member having a second reflector surface configured to reflect light. The second reflector surface and the emitting axis define a second reflector angle, with the second reflector surface being moveable relative to the emitting axis to vary the second reflector angle. The first reflector surface and the second reflector surface are disposed on opposed sides of the emitting axis.

The light fixture may additionally include a lens coupled to the first elongate body. The lens may be configured to allow light to pass therethrough. The lens may be define optical properties desired by the user, such as a particular color or transparency level to achieve a desired brightness.

In addition to the foregoing, there is also provided a method of assembling a light fixture. One embodiment of the method includes providing a first elongate body and a second elongate body. The first elongate body defines a mounting surface and a first engagement surface. The second elongate body defines a second engagement surface being complimentary to the first engagement surface. The first elongate body is then coupled to the second elongate body by sliding the second elongate body relative to the first elongate body to cooperatively engage the first elongate body to the second elongate body. A light module is then provided having a module body including a first face and an opposing second face, with the first face being disposed adjacent the mounting surface. A light emitting device is mounted to the second face of the module body. The light emitting device defines an emitting axis about which light is emitted. The second face of the light module is then coupled to the mounting surface. A first reflector panel is disposed adjacent the light module, with the first reflector panel having a first reflector surface configured to reflect light. The first reflector surface and the emitting axis define a first reflector angle. The first reflector surface is moveable relative to the emitting axis to vary the first reflector angle. A second reflector panel is disposed adjacent the light module, with the second reflector panel having a second reflector surface configured to reflect light. The second reflector surface and the emitting axis define a second reflector angle, with the second reflector surface being moveable relative to the emitting axis to vary the second reflector angle.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
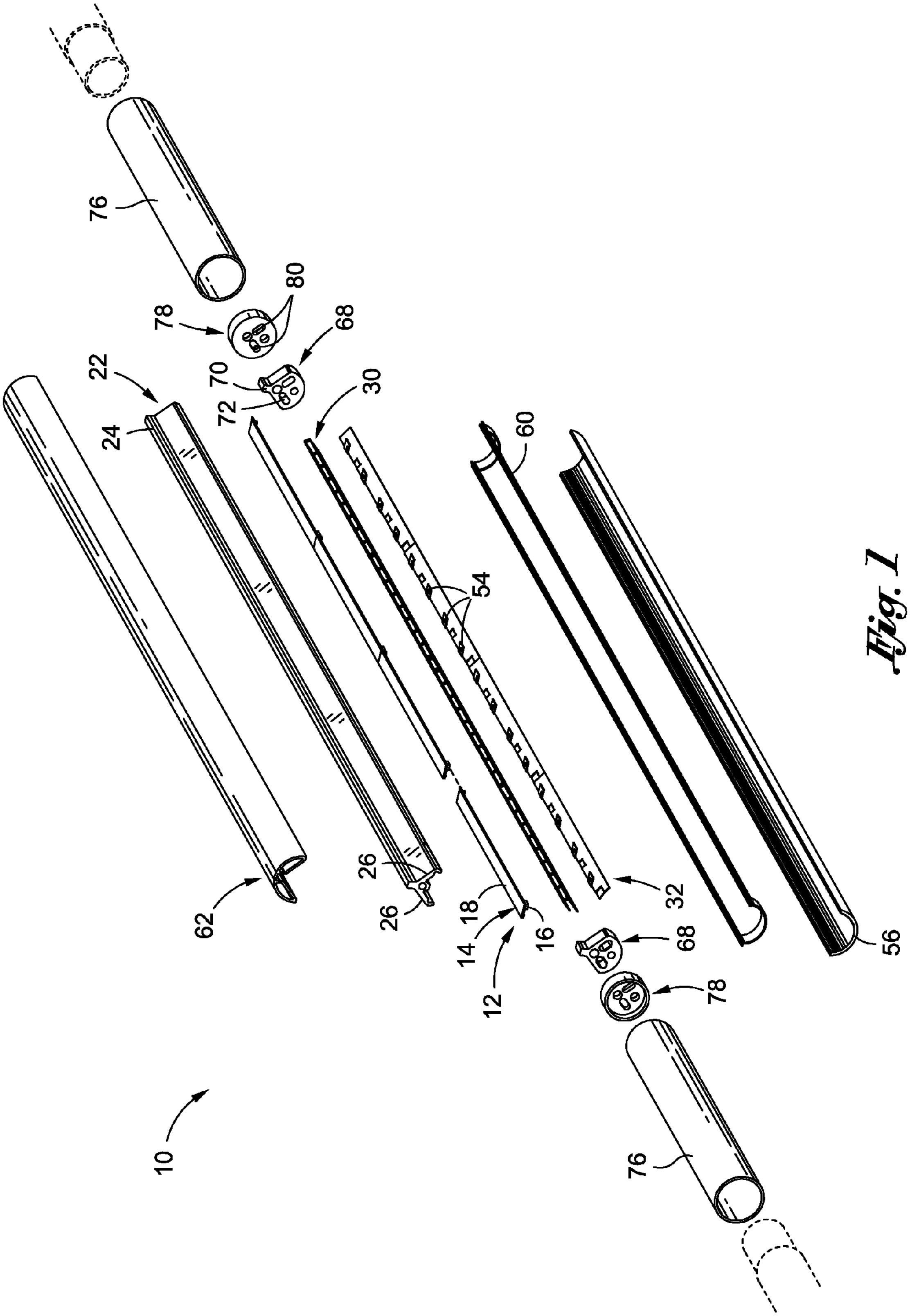
FIG. 1 is upper perspective exploded view of a light fixture.
Figures 2, 3A, 3B:
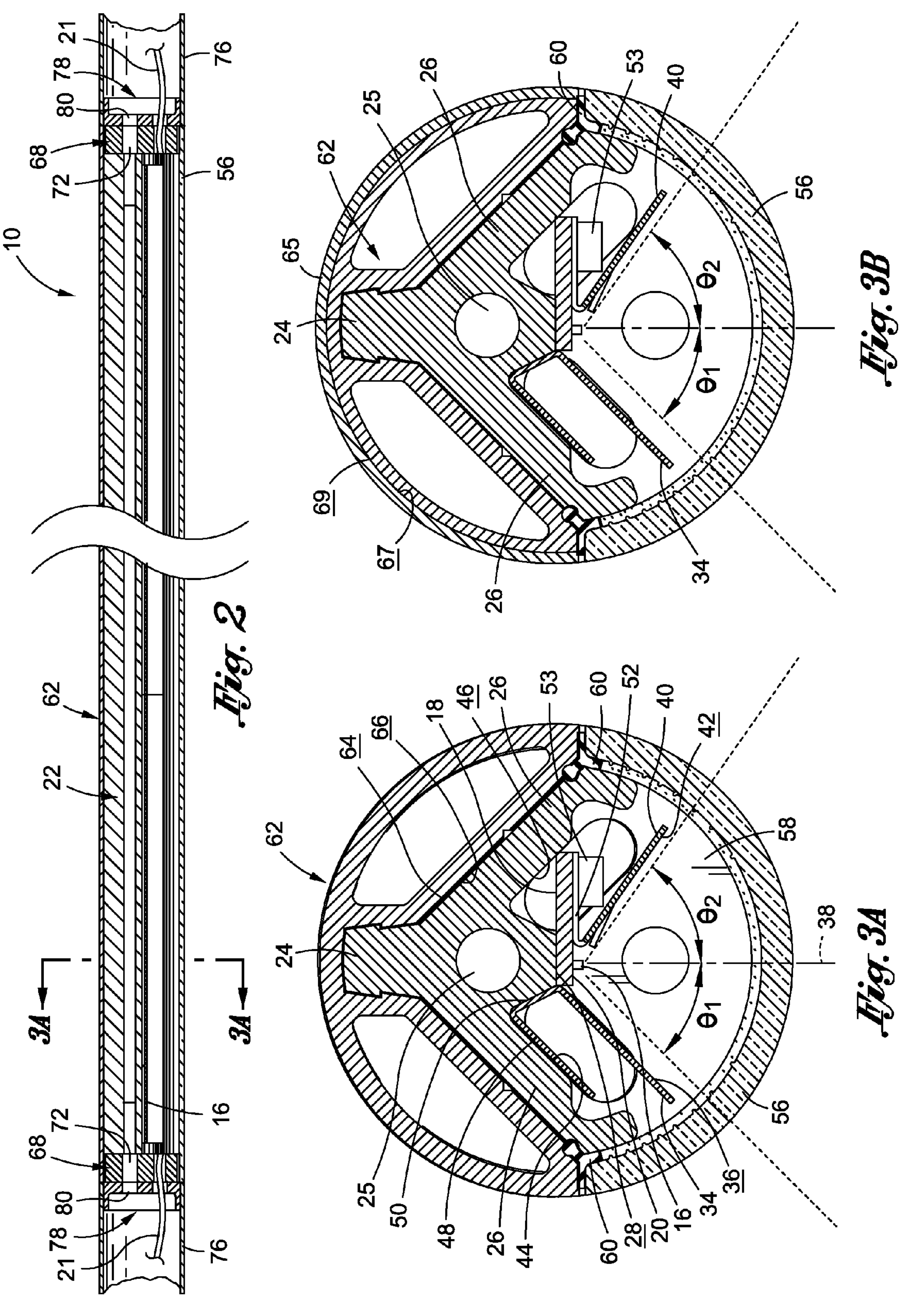
FIG. 2 is cross sectional side view of the light fixture.
FIG. 3A is a cross sectional end view of the light fixture.
FIG. 3B is a cross sectional end view of a second embodiment of the light fixture.

Referring now to FIGS. 1-3, there is shown an embodiment of an elongate light fixture 10 configured to emit light along the length of the light fixture 10. The light fixture 10 may be designed to allow a user to vary the angle at which light emanates from the light fixture 10. The light fixture 10 may additionally be constructed to enable quick and easy access to the lights to facilitate repair and replacements of the lights.

The light fixture 10 includes a light module 12 including a module body 14 and a plurality of light emitting devices 16. The module body 14 includes a first face 18 and an opposing second face 20. As used herein, a "light emitting device" is a component from which light emanates. The light emitting devices 16 may be LEDs, or other lighting devices known by those skilled in the art. In the embodiment depicted in the figures, the light emitting devices 16 are mounted to the second face 20 of the module body 14.

According to one implementation, the light module 12 may be prefabricated for installation into the light fixture 10. An exemplary light module 12 is the HF2 Narrow Stick, manufactured by SYLVANIA; however other light modules 12 known by those skilled in the art may also be used without departing from the spirit and scope of the present invention.

The light emitting devices 16 may be mounted to the module body 14 in a linear array extending along the length of the module body 14. Although the light module 12 depicted in the figures only includes one array of light emitting devices 16, it is contemplated that other embodiments may include multiple arrays of light emitting devices 16. Furthermore, the spacing between the individual light emitting devices 16 may be varied to achieve a desired brightness level.

Depending on the length of the light fixture 10, multiple light modules 12 may be used to extend along the length of the light fixture 10. The modules 12 may be configured to connect in an end-to-end arrangement to mechanically and electrically couple adjacent light modules 12.

Power for the light modules 12 may be provided by an adjacent power source (not shown) and communicated to the light modules 12 via wire 21 (See FIG. 2). At the opposite end of the light fixture 12, a wire 21 may communicate power to light modules 12 in an adjacent fixture 10 (not shown). Those skilled in the art will recognize that a fixture 10 which is the last in a series of fixtures 10 will include an incoming wire 21, but will typically not include an outgoing wire 21.

The light module 12 is disposed adjacent a first elongate body 22. The first elongate body 22 defines a generally "Y" shaped cross section including a stem portion 24 and a pair of wing portions 26 connected to the stem portion 24. The first elongate body 22 defines a mounting surface 28 disposed between the pair of wing portions 26. A center hole 25 may be formed within the first elongate body 22 at the intersection of the stem portion 24 and wing portions 26, and extend along the length of the first elongate body 22. The center hole 25 may be sized for mounting attachments at each end of the first elongate body 22. In addition, the strength of the first elongate body 22 may be increased by placing a tension rod (not shown) within the center hole 25.

The module body 14 is disposed adjacent the mounting surface 28 of the first elongate body 22. An adhesive tape may be sued to mount the module body 14 to the mounting surface 28 of the first elongate body 22. Those skilled in the art will recognized that other mechanical fasteners may also be used without departing from the spirit and scope of the present invention.

It is understood that the light emitting devices 16 may generate heat during operation thereof. Accordingly, it is desirable to transfer the heat away from the light emitting devices 16 to maintain the temperature of the light emitting devices 16 within an operable temperature range. To this end, in one embodiment, the module body 14 is disposed in abutting contact with the first elongate body 22 to allow for heat transfer from the light emitting devices 16 to the first elongate body 22, via the module body 14. The first elongate body 22 may be formed out of a material configured to facilitate heat transfer from the light emitting devices 16 to the first elongate body 22, such as aluminum, or other materials known in the art.

The light emitting devices 16 may emit light in all directions; however, it may be desirable to focus the light within a particular broadcast range or angular emission range. For instance, in some situations, it may be desirable to emit light at a wide angle, while in other situations, it may be desirable to focus the light emission within a narrow range. As such, the light fixture 10 includes one or more reflectors to vary the angle at which light is emitted from the light fixture 10.

In the embodiment depicted in FIG. 3A, the light fixture 10 includes a first reflector 30 and a second reflector 32. The first reflector 30 includes a first reflector panel 34 having a first reflector surface 36 configured to reflect light emanating from the light emitting devices 16. The light emitting device 16 defines an emitting axis 38 about which light emanates therefrom. The first reflector surface 36 and the emitting axis 38 define a first reflector angle $\theta_1$. The first reflector surface 36 is movable relative to the emitting axis 38 to vary the first reflector angle $\theta_1$.

Multiple first reflectors 30 may extend along the length of the light fixture 10. Each first reflector 30 defines a respective first reflector angle $\theta_1$, which may be independently adjustable. In other words, the first reflector angle $\theta_1$ may vary along the length of the light fixture 10.

The second reflector 32 defines a second reflector panel 40 having a second reflector surface 42 configured to reflect light. The first reflector surface 36 and the second reflector surface 42 are disposed on opposed sides of the emitting axis 38. The second reflector surface 42 and the emitting axis 38 define a second reflector angle $\theta_2$. The second reflector surface 42 is movable relative to the emitting axis 38 to vary the second reflector angle $\theta_2$. The first reflector angle $\theta_1$ may be varied independent of the second reflector angle $\theta_2$, and vice versa.

Multiple second reflectors 32 may extend along the length of the light fixture 10. Each second reflector 32 defines a respective second reflector angle $\theta_2$, which may be independently adjustable. In other words, the second reflector angle $\theta_2$ may vary along the length of the light fixture 10.

In one implementation, the first reflector angle $\theta_1$ is variable from '30° to 70° relative to the emitting axis 38. In this respect, the first reflector 30 may be adjusted to any position within its variable angular range. Likewise, the second reflector angle $\theta_2$ may also be varied from −30° to 70° relative to the emitting axis 38, and may be adjusted to any position within such angular range, independent of the first reflector 30.

One particular reflector position which may be desirable is to adjust one of the reflectors 30, 32 to −30°, and the other one of the reflectors 30, 32 to 70°. The benefit of this adjustment is that one of the reflectors 30, 32 crosses in front of the main beam and directs most, if not all, of the light out of the fixture 10 at an angle which is proven to increase the footcandle levels on the ground. It is understood that the foregoing angular position is exemplary in nature only and that the reflectors 30, 32 are not limited to such angular position. Rather, the reflectors 30, 32 may be adjusted to any angular position within their respective adjustable ranges.

Figure 4:
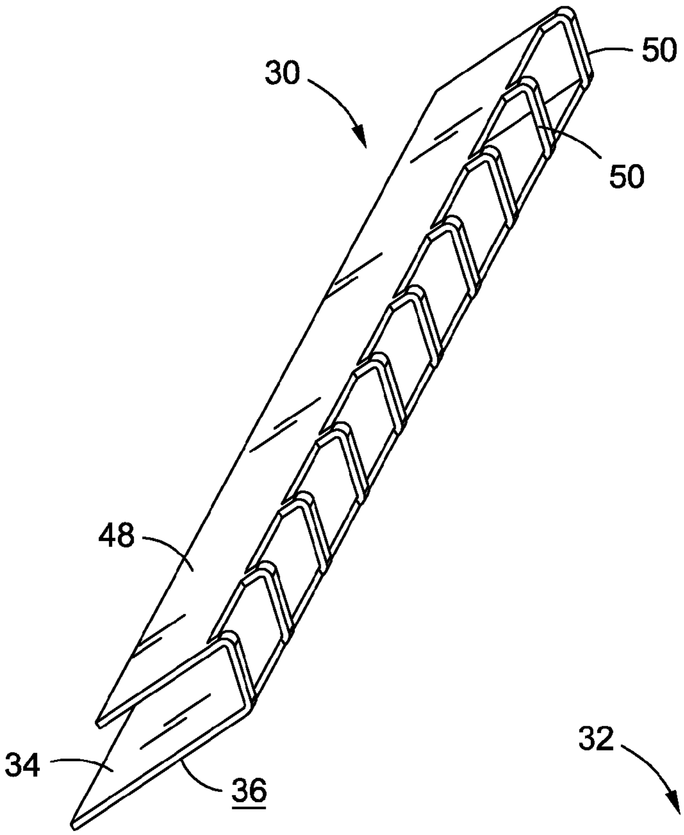
FIG. 4 is an upper perspective view of a first reflector member.
Figure 5:
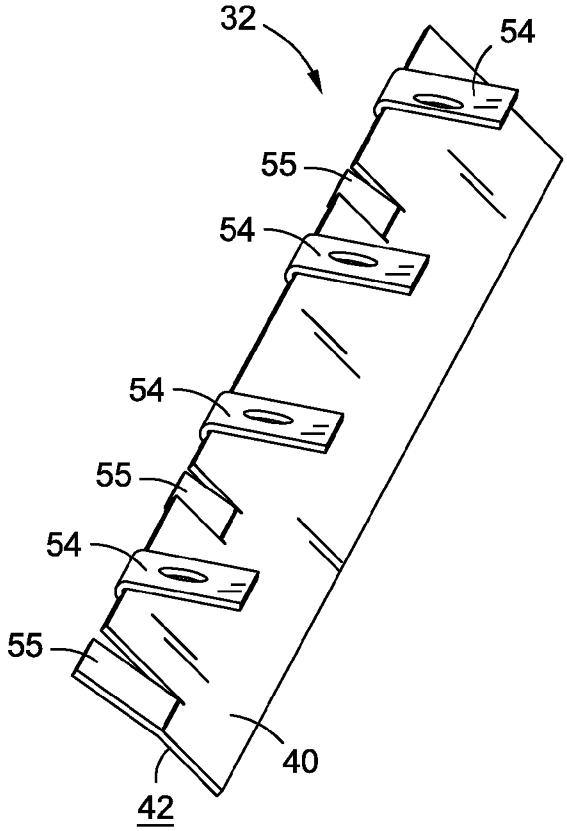
FIG. 5 is an upper perspective view of a second reflector member.

Referring now to FIGS. 3A, 4, and 5, the first reflector 30 and the second reflector 32 may be received within the wing portions 26 of the first elongate body 22. The wing portions 26 may be configured to engage with the first reflector 30 and the second reflector 32 to hold the reflectors 30, 32 in place. The wing portions 26 may define a first wing inner surface 44 and a second wing inner surface 46. As shown, the first reflector 30 is engaged with the first wing inner surface 44. In particular, the first reflector 30 includes a first reflector base 48 disposed in contact with the first wing inner surface 44. An adhesive tape may be used to connect the first reflector base 48 to the first wing inner surface 44. The first reflector panel 34 is pivotably coupled to the first reflector base 48. The first reflector base 48 may define a series of ribs 50 connected to the first reflector panel 34, wherein the first reflector panel 34 is pivotable relative to the ribs 50.

The reflectors 30, 32 may also be mounted to the light module 12. In the embodiment depicted in FIG. 3A, the second reflector 32 is mounted to the light module 12. Rivets or other mechanical fasteners may be used to couple the second reflector 32 to the light module 12. The second reflector 32 includes a second reflector base 52 mounted to the module body 14. The second reflector base 52 may define a plurality of tabs 54 which may be mechanically fastened (i.e., riveted) to the module body 14. The tabs 54 may be spaced apart to accommodate miscellaneous electrical components 53 disposed along module body 14. The second reflector 32 may also include one or more bendable flaps 55 formed within the second reflector panel 40 to provide spacing for the miscellaneous electrical components 53 mounted on the module body 14. The second reflector panel 40 is pivotably movable relative to the second reflector base 52.

The light fixture 10 may additionally include a lens 56 coupled to the first elongate body 22. The lens 56 may cover the light emitting devices 16 to protect the light emitting devices 16. In this regard, the lens 56 and the first elongate body 22 may define an inner cavity 58 within which the light emitting devices 16 may be disposed. The lens 56 may be formed to have optical properties desired by the user. The lens 56 may be translucent (i.e., allow light to pass therethrough), and may be frosted or darkened to limit the amount of light which passes through the lens 56. The lens 56 may also be configured to diffuse the light from the light emitting devices 16 to substantially eliminate any dark areas between the individual lights. This may generate an illusion of a solid light bar, rather than individual light emitting devices 16. The lens 56 may also be clear, or define other colors desired by the user. The lens 56 may be fabricated from various plastic compositions, such as High Impact Acrylic or polycarbonate.

The lens 56 may be configured to detachably engageable with the first elongate body 22. In this regard, the lens 56 may be detached from the first elongate body 22 to access the light module 12 to repair or replace the light module 12. After the light module 12 has been repaired or replaced, the lens 56 may be engaged with the first elongate body 22.

It may be desirable to create a fluid tight engagement between the lens 56 and the first elongate body 22. Accordingly, one embodiment includes a seal 60 disposed between the lens 56 and the first elongate body 22. The seal 60 extends along the length of the first elongate body 22 and the lens 56 to create a substantially fluid tight engagement between the first elongate body 22 and the lens 56.

It is contemplated that the light fixture 10 may be adaptable for use in a wide range of lighting applications. In one particular embodiment, and referring now to FIG. 6, the light fixture 10 is incorporated into a handrail extending along a pathway or staircase, to provide light therealong. Given that the handrail is designed to be gripped by those traversing along the pathway or stairway, the light fixture 10 may include a gripping surface. The gripping surface may be defined by a second elongate body 62 (See FIG. 3A) configured to cooperatively engage with the first elongate body 22. More specifically, the first elongate body 22 includes a first engagement surface 64 extending over the stem portion 24 and the wing portions 26. The second elongate body 62 defines a second engagement surface 66 which is complimentary to the first engagement surface 64. The second elongate body 62 may be configured to slide over the first elongate body 22 to cooperatively engage the second elongate body 62 to the first elongate body 22 and to dispose the second engagement surface 66 adjacent the first engagement surface 64. The first elongate body 22 and the second elongate body 62 may be formed by an extrusion process to create the desired cross sectional shapes to facilitate the cooperative engagement therebetween.

The lens 56 and second elongate body 62 collectively define a substantially cylindrical cross section which is easily graspable by an individual traversing the stairway. In one embodiment, the lens 56 and second elongate body 62 define an outer diameter that is approximately 1.9 inches; however, the lens 56 and second elongate body 62 may define other shapes and sizes without departing from the spirit and scope of the present invention.

Referring now to FIG. 3B, there is depicted a second embodiment of the light fixture 10 including a second elongate body 62 which is slightly reduced in size so as to accommodate a cover 65 disposable adjacent the second elongate body 62. The cover 65 may provide a decorative appearance or may be fabricated from a material that differs from the second elongate body 62. The cover 65 defines a cover inner surface 67 which is disposed adjacent an outer surface 69 of the second elongate body 62. An adhesive or other mechanical fastener may be used to join the cover 65 to the second elongate body 62. The cover 65 and the lens 56 may collectively define an outer diameter that is approximately 1.9 inches; however, other shapes and sizes may also be defined thereby.

Referring now back to FIG. 1, the light fixture 10 may further include an end piece 68 disposed at opposed ends of the light fixture 10 to substantially close off the inner cavity 58. Each end piece 68 may engage with the second elongate body 62 in a manner similar to the first elongate body 22. In this regard, the end piece 68 may include a stem portion 70 that is sized and shaped similar to the stem portion 24 of the first elongate body 22. The stem portion 70 of the end piece 68 is also complimentary to the second engagement surface 66 of the second elongate body 62 to enable slidable cooperative engagement between the end piece 68 and second elongate body 62. The end piece 68 may define one or more apertures 72 to allow for wiring and/or other components to pass therethrough.

Figure 6:
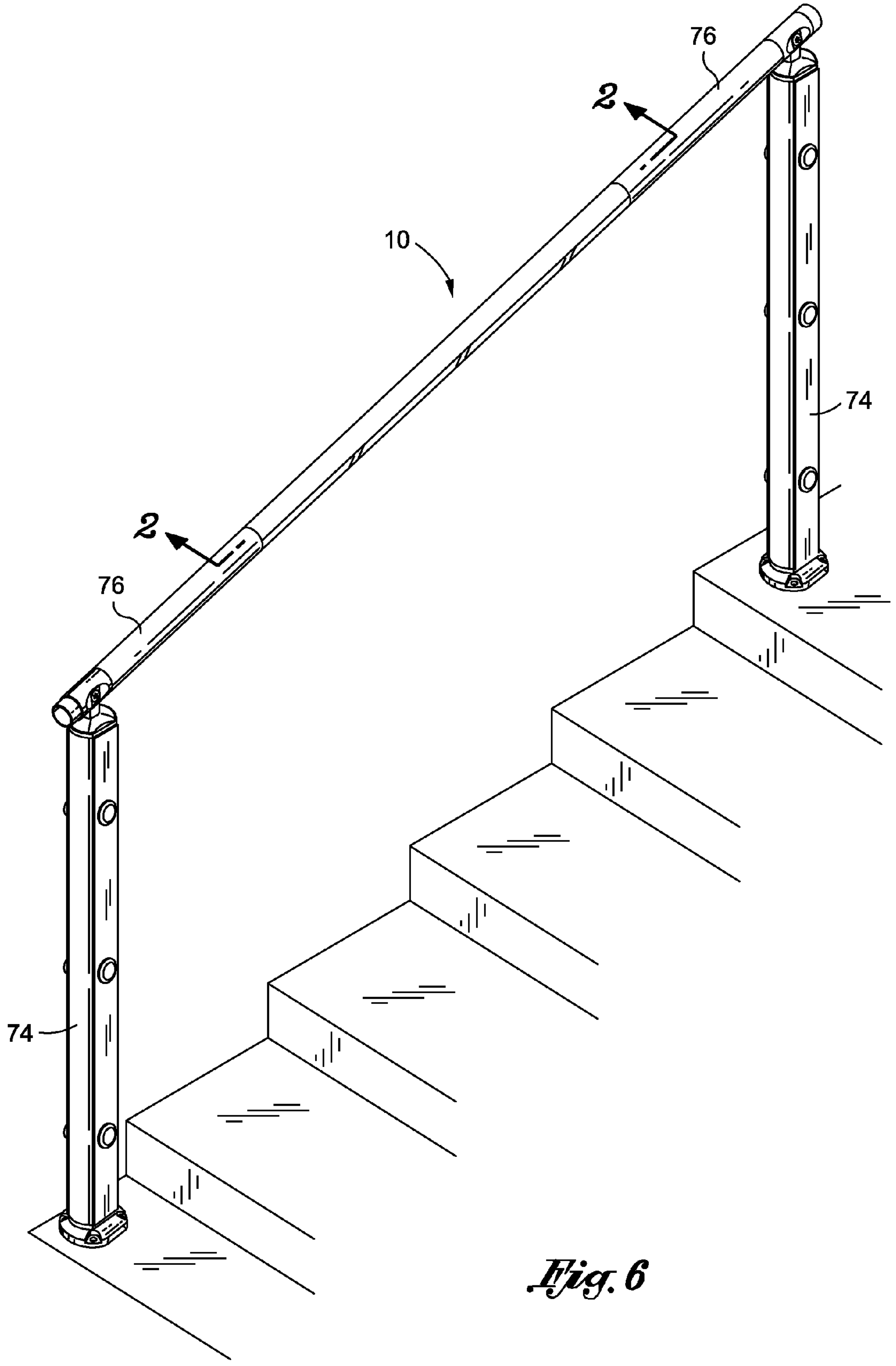
FIG. 6 is an upper perspective view of a staircase handrail with the light fixture integrated into the handrail.

With regard to the handrail embodiment depicted in FIG. 6, the light fixture 10 may be disposed between a pair of support posts 74. Spacers 76 may be disposed between the light fixture 10 and the posts 74. A driver (not shown) may be disposed within the support posts 74 to step down the voltage to drive the light modules 12. A wire may pass through the spacer 76 to electrically connect the light module 12 to the driver located in the support post 74. A spacer cap 78 may define apertures 80 similar to the apertures 72 formed within the end piece 68 to accommodate wires or other electrical components.

Although the light fixture 10 is shown as being incorporated into a handrail, it is also contemplated that the light fixture 10 may be used as pendent light, or other light applications known by those skilled in the art.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A light fixture comprising:
- a first elongate body defining a mounting surface;
- a light module including:
  - a module body having a first face and an opposing second face, the first face being disposed adjacent the mounting surface; and
  - a light emitting device mounted to the second face of the module body, the light emitting device defining an emitting axis about which light is emitted;
- a first reflector member having a first reflector surface configured to reflect light, the first reflector surface and the emitting axis defining a first reflector angle, the first reflector surface being moveable relative to the emitting axis to vary the first reflector angle; and
- a second reflector member having a second reflector surface configured to reflect light, the second reflector surface and the emitting axis defining a second reflector angle, the second reflector surface being moveable relative to the emitting axis to vary the second reflector angle;
- wherein the first reflector surface and the second reflector surface are disposed on opposed sides of the emitting axis.

2. The light fixture recited in claim 1, further comprising a lens coupled to the first elongate body, the lens being configured to allow light to pass therethrough.

3. The light fixture recited in claim 1, wherein the first reflector member further includes a first reflector base pivotally coupled to the first reflector surface.

4. The light fixture recited in claim 1, wherein the second reflector member further includes a second reflector base pivotally coupled to the second reflector surface.

5. The light fixture recited in claim 4, wherein the second reflector base is mounted to the module body.

6. The light fixture recited in claim 1, further comprising seal disposed between the first elongate body and the lens to define a substantially fluid tight engagement between the first elongate body and the lens.

7. The light fixture recited in claim 1, further comprising a second elongate body cooperatively engageable with the first elongate body.

8. The light fixture recited in claim 7, wherein the first elongate body defines a first engagement surface and the second elongate body defines a second engagement surface being complimentary to the first engagement surface.

9. The light fixture recited in claim 1, wherein the module body is in abutting contact with the first elongate body.

10. The light fixture recited in claim 1, wherein the first elongate body is configured to absorb heat from the module body.

11. The light fixture recited in claim 1, wherein the first reflector angle is adjustable from zero degrees relative to the emitting axis to seventy degrees relative to the emitting axis.

12. The light fixture recited in claim 11, wherein the second reflector angle is adjustable from zero degrees relative to the emitting axis to seventy degrees relative to the emitting axis.

13. The light fixture recited in claim 1, further comprising a third reflector panel disposed adjacent the first reflector panel, the third reflector panel and second reflector panel being on opposed sides of the emitting axis, the third reflector panel having a third reflector surface configured to reflect light, the third reflector surface and the emitting axis defining a third reflector angle, the third reflector surface being moveable relative to the emitting axis to vary the third reflector angle.

14. A light fixture comprising:
- a first elongate body defining a mounting surface;
- a light module including:
  - a module body having a first face and an opposing second face, the first face being disposed adjacent the mounting surface; and
  - a light emitting device mounted to the second face of the module body, the light emitting device defining an emitting axis about which light is emitted; and
- a first reflector panel having a first reflector surface configured to reflect light, the first reflector surface and the emitting axis defining a first reflector angle, the first reflector surface being moveable relative to the emitting axis to vary the first reflector angle.

15. The light fixture recited in claim 14, further comprising a lens coupled to the first elongate body, the lens being configured to allow light to pass therethrough.

16. The light fixture recited in claim 14, wherein the first reflector member further includes a first reflector base pivotally coupled to the first reflector surface.

17. A method of assembling a light fixture, the method comprising the steps of:
- a. providing:
  - a first elongate body defining a mounting surface and a first engagement surface; and
  - a second elongate body defining a second engagement surface being complimentary to the first engagement surface;
- b. coupling the first elongate body to the second elongate body by sliding the second elongate body relative to the first elongate body to cooperatively engage the first elongate body to the second elongate body;
- c. providing a light module having:
  - a module body having a first face and an opposing second face, the first face being disposed adjacent the mounting surface; and
  - a light emitting device mounted to the second face of the module body, the light emitting device defining an emitting axis about which light is emitted;
- d. coupling the second face of the light module to the mounting surface;
- e. disposing a first reflector panel adjacent the light module, the first reflector panel having a first reflector surface configured to reflect light, the first reflector surface and the emitting axis defining a first reflector angle, the first reflector surface being moveable relative to the emitting axis to vary the first reflector angle; and f. disposing a second reflector panel adjacent the light module, the second reflector panel having a second reflector surface configured to reflect light, the second reflector surface and the emitting axis defining a second reflector angle, the second reflector surface being moveable relative to the emitting axis to vary the second reflector angle.

18. The method recited in claim 17, further comprising the step of adjusting the first reflector angle by pivoting the first reflector surface relative to the emitting axis.

19. The method recited in claim 18, further comprising the step of adjusting the second reflector angle by pivoting the second reflector surface relative to the emitting axis.

20. The method recited in claim 17, further comprising the step of coupling a lens to the first elongate body the lens being configured to allow light to pass therethrough.

* * * * *